United States Patent [19]

Sugiyama et al.

[11] 4,433,347
[45] Feb. 21, 1984

[54] APPARATUS FOR AUTOMATICALLY REPRODUCING SIGNALS IN ACCORDANCE WITH A MODE OF THE RECORDED SIGNALS

[75] Inventors: Hiroyuki Sugiyama, Isehara; Kenji Yoshihara, Chiba; Yasuhiro Yusa, Fujisawa; Ryozo Abe; Masaki Sakurai, both of Yokohama, all of Japan

[73] Assignee: Victor Company of Japan, Ltd., Yokohama, Japan

[21] Appl. No.: 293,834

[22] Filed: Aug. 18, 1981

[30] Foreign Application Priority Data

Aug. 19, 1980 [JP] Japan .................. 55-113761

[51] Int. Cl.$^3$ ............................... H04N 5/76
[52] U.S. Cl. ..................... 358/342; 360/97; 369/48; 369/77.2
[58] Field of Search ............ 360/97, 99, 133; 358/310, 335, 342, 343, 143, 144, 145, 147; 369/14, 15, 48, 49, 86, 89, 111, 124, 128, 30, 32, 77

[56] References Cited

U.S. PATENT DOCUMENTS 3,601,555 8/1971 Peterson ........................ 369/30
3,843,967 10/1974 Mulvany ........................ 360/133
4,013,841 3/1977 Ohkubo et al. .................. 369/49
4,205,853 6/1980 Torrington ..................... 369/77
4,206,926 6/1980 Stave .......................... 369/77
4,352,175 9/1982 Crooks ......................... 369/77
4,353,090 10/1982 Broadbent ...................... 358/342
4,356,510 10/1982 Nakayama ....................... 358/143
4,361,849 11/1982 Bolger ......................... 358/342

FOREIGN PATENT DOCUMENTS 1503339 8/1978 United Kingdom .

Primary Examiner—Bernard Konick
Assistant Examiner—Donald McElheny, Jr.
Attorney, Agent, or Firm—Louis Bernat

[57] ABSTRACT

An apparatus for automatically reproducing recorded signals from a rotary recording medium, in accordance with the mode in which signals were recorded. The reproducing apparatus comprises a micro-computer which produces a two-bit mode control signal and a one-bit muting signal. The one-bit muting signal puts one of two processing circuits in a non-operational state, so that the other of the two processing circuits can perform the signal processing in accordance with the mode specified by the two-bit mode control signal. Four codes constituted by the two-bit mode control signal are commonly used to specify four reproducing modes of a video rotary recording medium and four reproducing modes of an audio rotary recording medium.

6 Claims, 6 Drawing Figures

APPARATUS FOR AUTOMATICALLY REPRODUCING SIGNALS IN ACCORDANCE WITH A MODE OF THE RECORDED SIGNALS

BACKGROUND OF THE INVENTION

The present invention generally relates to rotary recording medium reproducing apparatus, and more particularly to apparatus which is capable of selectively reproducing a rotary recording medium (hereinafter simply referred to as a "video disc") on wich a video signal is recorded as a main information signal, and a rotary recording medium (hereinafter simply referred to as an "audio disc") on which an audio signal is recorded as a main information signal. A signal for changing over and operating a reproducing circuit according to the mode of the recorded signal in the respective discs is used in common for both kinds of discs.

Generally, a video disc is recorded with a video signal as a main information signal, and is further recorded with an audio signal which accompanies the video signal, as a secondary information signal. Accordingly, the following four kinds of video discs can be considered according to the mode of the above audio signal. That is, video discs may have an audio signal recorded in a monaural signal mode, or in a stereo signal mode. The audio signal is in a bilingual A (English, for example) mode, and the audio signal is in a bilingual B (German or French, for example) mode.

On the other hand, an audio disc is recorded with an audio signal as a main information signal. A case can be considered where a still picture video signal, which accompanies the audio signal, is recorded as a secondary information signal. Since a signal share for four channels can be recorded in one track of the audio disc, the following four kinds of modes can be considered in the recorded signal. That is, a mode in which a three-channel audio signal and a still picture video signal are recorded simultaneously, a mode in which a four-channel audio signal is recorded, a mode in which a two-channel stereo signal of a first program system is recorded, and a mode in which a two-channel stereo signal of a second program system is recorded. The two-channel stereo signal of the second program system is time-divisionally recorded on the same track with respect to the two-channel stereo signal of the first program system as the two-channel signal of the first program system.

The above described video disc and the audio disc respectively have a recorded discriminating signal, respective of each recorded mode, which signal is included within an address signal. Hence, the reproducing apparatus detects the discriminating signal within the address signal to discriminate each signal mode, and changes over the operation of a matrix circuit or a decoder within a reproducing circuit. However, a discriminating circuit, which performs the above discrimination, produces a total of eight kinds of discriminating signals, which requires too many output ports on a micro-computer which includes the discriminating circuit, and the circuit construction of the apparatus becomes complex.

SUMMARY OF THE INVENTION

Accordingly, it is a general object of the present invention to provide a novel and useful rotary recording medium reproducing apparatus in which the above described disadvantages have been overcome.

Another and more specific object of the present invention is to provide a rotary recording medium reproducing apparatus in which the number of output ports of a microcomputer is reduced, by using the kinds of discriminating signals which are recorded in common for a video disc and an audio disc in order to reduce the number of different kinds of discriminating signals.

Still another object of the present invention is to provide a rotary recording medium reproducing apparatus in which the operation of a matrix circuit or a decoder is changed over, by using a discriminating signal of the kinds of four recorded signal modes of the signal recorded in a video disc and a discriminating signal of the kinds of four recorded signal modes of the signal recorded in an audio disc in common.

Other objects and further features of the present invention will be apparent from the following detailed description when read in conjunction with the accompanying drawings.

DETAILED DESCRIPTION

Figure 1:
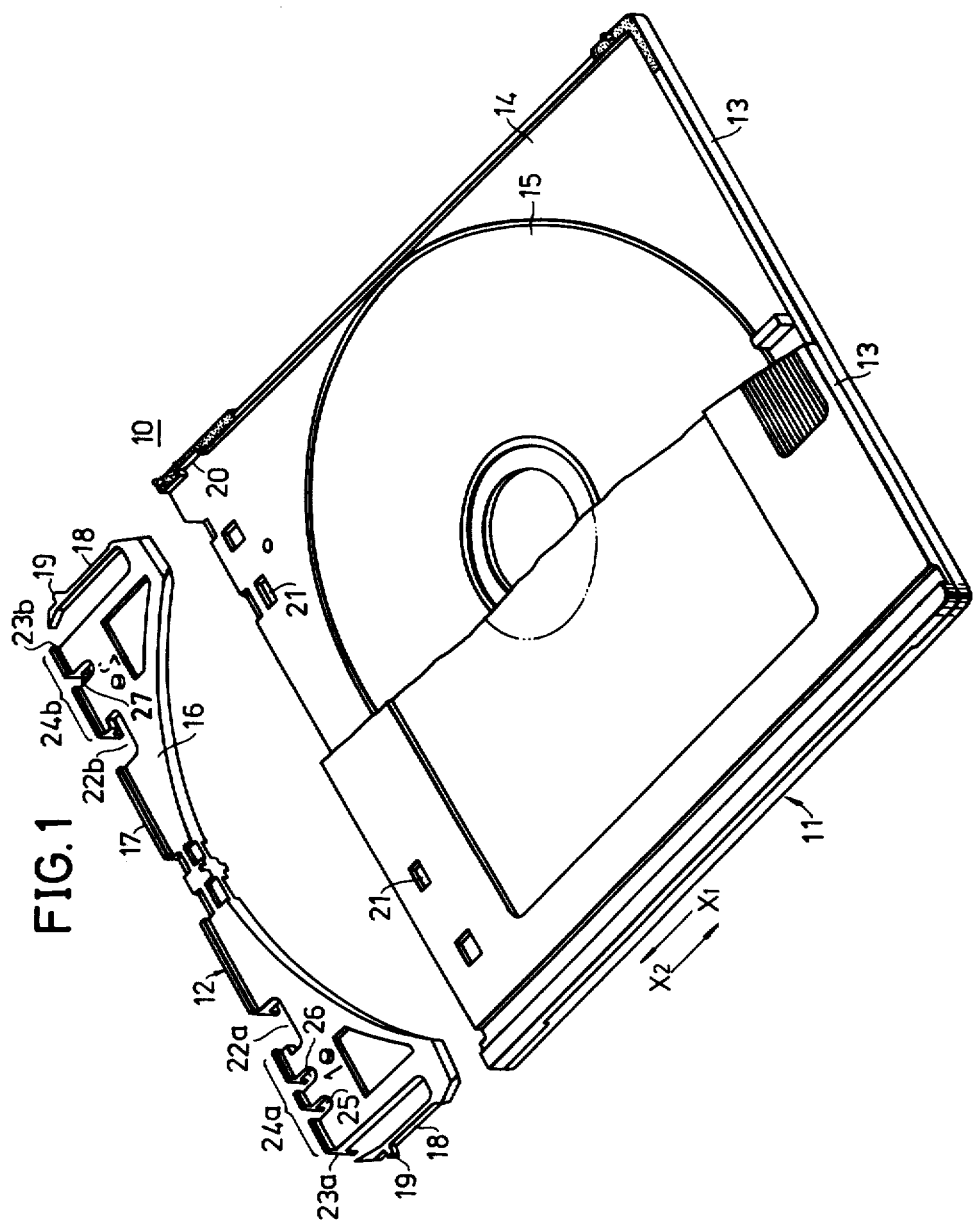
FIG. 1 is a perspective view, with a part cut away and disassembled, showing an example of a disc case which operates together with a rotary recording medium according to the present invention.

In FIG. 1, a disc case 10 comprises a jacket 11 and a lid plate 12. The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 fit into depressions 20, and thus, the lid plate 12 engages the jacket 11.

A pair of engaging cutouts 22a and 22b are respectively formed at the front edge of the lid plate 12. Further, cutouts 25 and 26 are respectively formed at a detection part 24a between the cutout 22a and a left side edge portion 23a, at the front edge of the lid plate 12. On the other hand, a cutout 27 is formed at a detection part 24b between the cutout 22b and a right side edge portion 23b, at the front edge of the lid plate 12.

Figure 2:
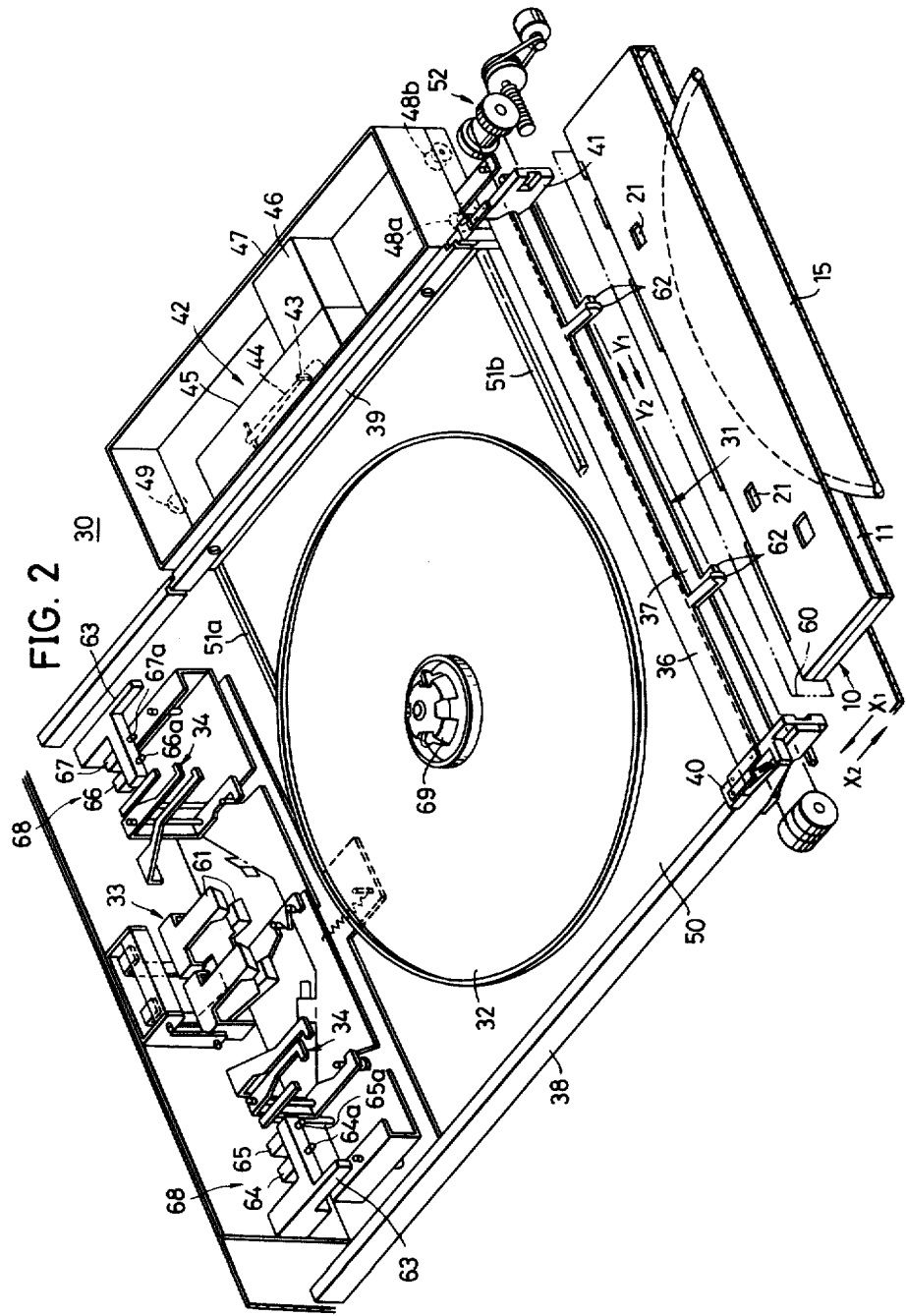
FIG. 2 is a diagram showing an embodiment of a rotary recording medium reproducing apparatus according to the present invention, with an outer frame disassembled.
Figure 3:
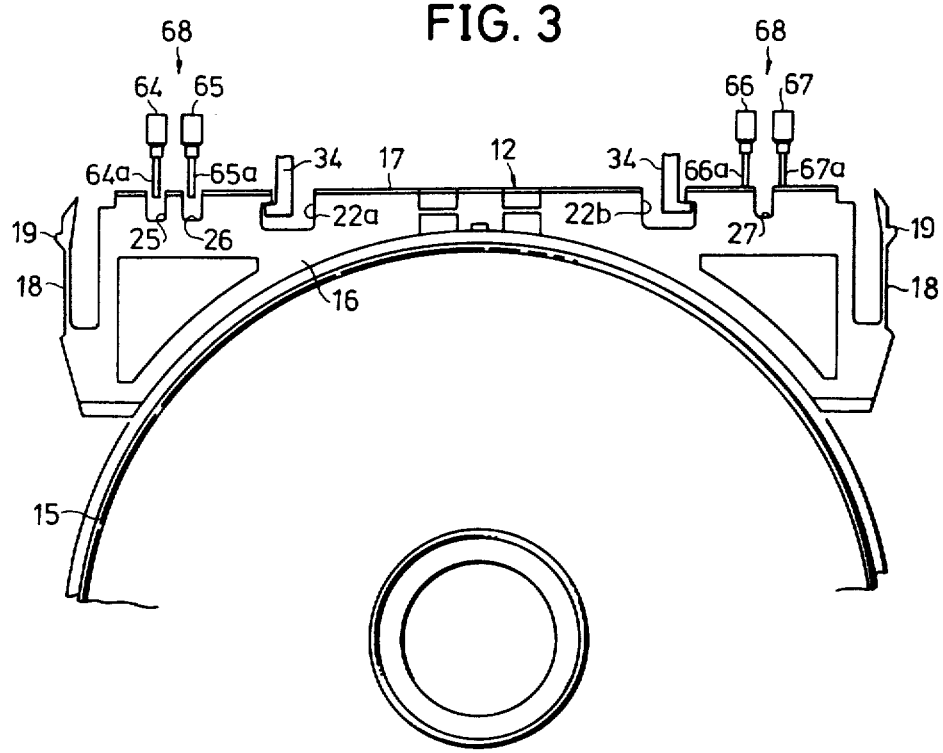
FIG. 3 is a plan view showing the relationship between a lid plate and a detection switch.

As shown in FIG. 2, a reproducing apparatus 30 substantially comprises a jacket opening enlarging mechanism 31, a turntable 32 to rotate the disc 15 positioned thereon, a disc holding mechanism 33 for clamping the disc 15, a lid plate locking mechanism 34 for locking the lid plate 12, and the like.

The jacket opening enlarging mechanism 31 comprises upper and lower beams 36 and 37 extending in the directions of the arrows Y1 and Y2. The supporting members 40 and 41 (sliders) are respectively fixedly inserted into the guide rails 38 and 39, to support both ends of the respective beams 36 and 37.

A reproducing transducer 42 comprises a pickup device 45 including a cantilever 44 having a reproducing stylus 43 at a tip end thereof. A resonator 46 and the like, and is mounted on a carriage 47. The carriage 47 has flange parts provided unitarily at both sides thereof. The flanges have grooved rollers 48a and 48b, and a roller 49. The roller 49 rolls over a rail 51a on a chassis 50 of the reproducing apparatus, and the rollers 48a and 48b respectively roll over a rail 51b. Accordingly, the carriage 47 moves in the directions of arrows Y1 and Y2.

The disc holding mechanism 33 is provided at the inner part of the reproducing apparatus 30 on the opposite side of an inserting opening 60, and comprises a pair of upper and lower holding fingers 61.

Upon reproduction of the disc 15, the disc case 10 is inserted through the inserting opening 60 of the reproducing apparatus 30. The disc case 10 is inserted with the side of the lid plate 12 facing the direction of the arrow X1. When the jacket opening enlarging mechanism 31 is pushed and moved in the direction of the arrow X1 by the disc case 10, the enlarging mechanism 31 moves, the upper and lower beams 36 and 37 rotate, and enlarging fingers 62 thus respectively move in directions to mutually separate from each other. Accordingly, the tip ends of the enlarging fingers 62 engage with engaging windows 21 of the jacket 11, and enlarge the front part of the upper and lower jacket halves 13 upwards and downwards, to enlarge the opening.

The disc case 10 is inserted into the innermost part of the reproducing apparatus 30 together with the enlarging mechanism 31, via the upper side of the turntable 32. Cutouts 22 of the lid plate 12 is locked by the lid plate locking mechanism 34. Hence, the lid plate 12 is locked and held at the innermost part of the reproducing apparatus 30.

Furthermore, engagement releasing members 63 enter inside the openings on the right and left sides of the disc case 10, and push sloping surfaces at the tip ends of the engaging arms 18. Accordingly, the engaging arms 18 are respectively distorted inwards. The projections 19 respectively slip out the depressions 20, release the engagement of the lid plate 12 with respect to the jacket 11. Further, the disc 15 is held at a predetermined height by the holding fingers 61.

Moreover, when the lid plate 12 is inserted into the innermost part of the reproducing apparatus 30 and locked as described above, the detection parts 24a and 24b at the front edge of the lid plate 12 oppose detection switches 64, 65, 66, and 67 (indicated by a detection switch group 68 as a whole) respectively having pins 64a, 65a, 66a, and 67a. The detection switches 64 through 67 which do not oppose the cutouts 25 through 27 are pushed and closed by the rim portion 17 of the lid plate 12. The detection switches which oppose the cutouts remain open.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. The disc 15 is supported horizontally and directly above the turntable 32 by the holding fingers 61 and a disc clamping mechanism 69 which is in a raised position, in a state where the jacket 11 is completely pulled out from the reproducing apparatus 30.

When a start button (not shown) is pushed, the disc holding mechanism 33 releases the holding operation, and the disc clamping mechanism 64 is lowered. The disc 15 is lowered onto the turntable 32 which is parallel with the chassis 50, and rotated in the clockwise direction. Further, the reproducing transducer 42 moves in the direction of the arrow Y1 together with the carriage 47, from a waiting position.

When the reproducing stylus 43 reaches the lead-in position of the disc 15, a current is supplied to a coil (not shown) for lowering the stylus. Accordingly, the reproducing stylus 43 is lowered, to make contact with the recording surface of the disc 15 which is placed onto the turntable 32, in a normal position with a predetermined stylus pressure. Therefore, the rotating disc 15 is scanned by the reproducing stylus 43 and the recorded signal is reproduced from the recording surface of the disc 15.

A description will now be given of the operation of the detection switch group 68. The detection switch 64 is provided for identifying the surface side of the disc. The surface side of the disc is identified as side-B when the detection switch 64 is pushed and closed by the lid plate 12. On the other hand, it is the surface side of the disc is side-A when the detection switch 64 enters within the cutout 25 of the lid plate 12 and remains open without being pushed by the lid plate 12. The detection switch 67 detects the kind of disc, and is closed when the disc is a video disc, and is open when the disc is an audio disc.

The detection switch 65 is provided for detecting the mode of the recorded audio signal. The audio signal mode is a bilingual mode (or a mode in which two-channels respectively form a program system to form two program systems) when the detection switch 65 is closed. On the other hand, it is a mode other than the bilingual mode when the detection switch 65 is open. Furthermore, the detection switch 66 is provided for detecting the system of the television signal. The television signal is an NTSC system when the detection switch 66 is closed, and a PAL (or an SECAM) system when the detection switch 66 is open. Accordingly, the positions, number, and the like of the cutouts 25 through 27 in the lid plate 12 differ according to the kind of the disc 15.

Figure 4:
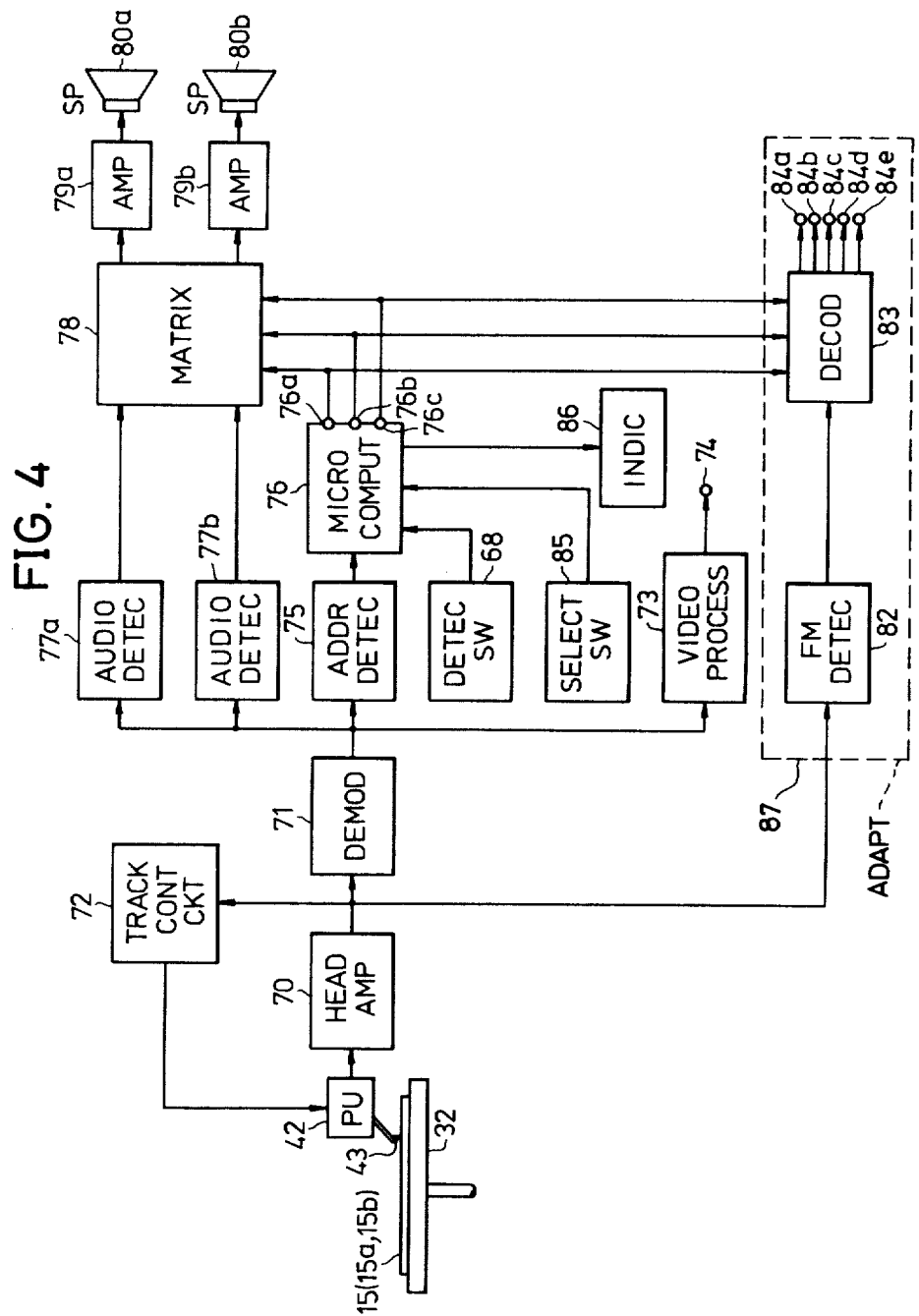
FIG. 4 is a systematic block diagram showing an embodiment of a rotary recording medium reproducing apparatus according to the present invention.

In FIG. 4, the disc 15 (a video disc 15a or an audio disc 15b), is rotated at a predetermined speed by the turntable 32. The reproducing stylus 43 of the signal pickup device 42 makes contact with the recording surface of the rotating disc 15, to pick up and reproduce the recorded information signal as a variation in the electrostatic capacitance between the disc 15 and the reproducing stylus 43. Further, reference signals for performing tracking control are recorded on the disc 15 in addition to the information signal. These reference signals are reproduced together with the information signal.

The signal picked up and reproduced from the disc 15, is supplied to a demodulator 71 and a tracking control circuit 72, through a head amplifier 70. Reference signals for tracking control are separated at the tracking control circuit 72. A tracking control signal is formed from these reference signals. The tracking control signal thus formed by the tracking control circuit 72 is supplied to a coil used for tracking within the signal pickup device 42. Accordingly, tracking control is performed so that the reproducing stylus 43 accurately scans over the video signal tracks on the disc 15.

On the other hand, when the disc 15 is the video disc 15a, the picked up signal is demodulated at the demodulator 71, and then supplied to a video signal processing circuit 17 wherein the video signal is subjected to a predetermined signal processing. Hence, the demodulated video signal thus subjected to the predetermined signal processing, is supplied from a terminal 74 to an image receiving tube (not shown) of a receiver, and is reproduced as a reproduced picture. Furthermore, the audio signal from the demodulator 71 is supplied to audio signal detectors 77a and 77b wherein the audio signal is subjected to wave-detection, and then supplied to a matrix circuit 78.

The signal from the demodulator 71 is also supplied to an address signal detection circuit 75 wherein an address signal within the signal thus supplied to the address signal detection circuit 75 is detected. The detected address signal is supplied to a micro-computer 76.

If the disc 15 is the video disc 15a, four fields of video signals, for example, are recorded in a spiral track of the audio disc 15b, for one rotation of the audio disc 15b. Further, vertical synchronizing signals are recorded at four positions per one track turn of the audio disc 15b. In each of the vertical blanking periods, a coded address signal (chapter address signal) is recorded to indicate the addresses of program numbers established in order for every plurality of programs recorded in the disc from the outermost peripheral side to the innermost peripheral side of the audio disc 15b. Local addresses are within the above plurality of programs, and are recorded at a position at the seventeenth H (H indicates a horizontal scanning period) from the rising edge of the vertical synchronizing signal. Further, a coded address signal (time address signal) indicates the absolute address of the position of the information signal as a time data which indicates the time required to perform normal reproduction from an outermost peripheral position of the audio disc 15b to the position indicated by the absolute address. This coded signal is recorded at a position at the eighteenth H from the rising edge of the vertical synchronizing signal. In addition, discrimination bits for identifying the above described four kinds of signal modes, are recorded following synchronizing bits of each address signal.

When the disc 15 is the audio disc 15b, the information signal consists of one hundred twenty-six blocks for one track turn, for example. The chapter address signal and the time address signal are constructed by bits in every block by a total of one hundred twenty-six bits. The discrimination bits for discriminating the above four kinds of signal modes, are recorded following the synchronizing bits of each address signal.

On the other hand, when the disc 15 is the audio disc 15b, the signal obtained from the head amplifier 70 is supplied to an FM detector 82 within an adapter 81. The signal thus supplied to the FM detector 82 is subjected to FM detection, and then supplied to a decoder 83. In the present embodiment of the invention, the FM detector 82 and the decoder 83 are mounted to the video disc reproducing apparatus as the adapter 81 for audio disc, according to the need, and can be removed from the reproducing apparatus. However, the adapter 81 can be assembled unitarily within the reproducing apparatus.

Figure 5:
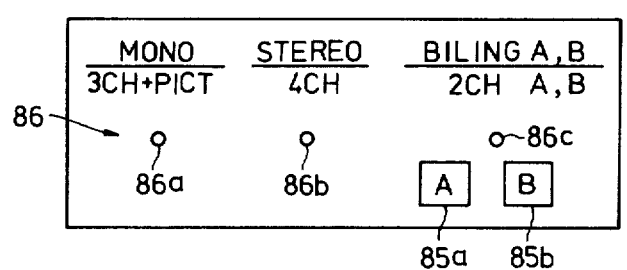
FIG. 5 is a front view showing an example of a display and manipulation panel.

A display and manipulation panel 90 is provided at the front surface of the reproducing apparatus 30, as shown in FIG. 5. A lamp 86a corresponding to an indication MONO/3CH+PICT of a monaural and three-channel plus still picture, a lamp 86b corresponding to an indication STEREO/4CH of a stereo and four-channel, and a lamp 86c corresponding to an indication BILING A,B/2CH A,B of a bilingual A,B and two-channel A,B, are respectively provided in the panel 90. The lamps 86a through 86c are shown as an indicator 86 in FIG. 4. Moreover, push-button switches 85a and 85b (shown as a selection switch 85 in FIG. 4) respectively corresponding to the bilingual A,B (two-channel A,B), are provided in the above panel 90.

When the video disc 15a is to be loaded into the reproducing apparatus 30 as the disc 15, the disc case 10 accommodating the video disc 15a is inserted into the reproducing apparatus 30. The lid plate 12 makes contact with the detection switch group 68 due to the insertion of the disc case 10. A result is obtained which indicates the open or closed states of each of the detection switches and is supplied to the microcomputer 76. Accordingly, the detection is performed to detect that the disc 15a is a video disc, whether the surface of the disc which is facing up (reproducing surface) is the first or the second side, whether the television system is the NTSC or the PAL (or SECAM) system, and the mode of the audio signal. According to the detected result, in a case where the audio signal is a monaural signal or a stereo signal, the lamp 86a or the lamp 86b of the indicator 86 is turned ON. On the other hand, when the audio signal is bilingual, the lamp 86c is turned ON.

In the case where the lamp 86c is turned ON, either one of the switches 85a and 85b is pushed, according to the language in which the audio signal is to be reproduced. Hence, a signal selected at the selection switch 85 in FIG. 4 is supplied to the micro-computer 76.

When reproduction of the loaded video disc 15a begins, the address signal detected at the address signal detection circuit 75 is supplied to the micro-computer 76 wherein a detection is performed to detect a mode discriminating signal included together with the address signal. The micro-computer 76 produces and supplies a mode control signal to the matrix circuit 78 through terminals 76a and 76b, by use of the detected mode bits and a selection signal from the selection switch 85. The above mode control signal produced by the micro-computer 76 is "0, 0" when the mode of the audio signal is monaural, "1, 0" when the mode of the auido signal is stereo, "0, 1" when the mode of the audio signal is bilingual and the switch 85a is pushed, that is, when the mode of the audio signal is bilingual A, and "1, 1" when the mode of the audio signal is bilingual and the switch 85b is pushed, that is, when the mode of the audio signal is bilingual B.

The above mode control signal is also supplied to the decoder 83. However, a muting signal is supplied to the decoder 83 through an output terminal 76c of the micro-computer 76, since the detection switch 68 detects that the loaded disc is a video disc. Accordingly, a circuit of an audio disc reproducing system is put into a non-operational state. Moreover, when the mode of the audio signal is monaural as indicated by the mode discriminating signal, the lamp 86b is turned OFF. On the other hand, when the mode of the audio signal is stereo, the lamp 86a is turned OFF.

When the mode of the audio signal is monaural or stereo, the matrix circuit 78 supplies the output audio signals of the audio signal detectors 77a and 77b as they are to speakers 80a and 80b, respectively, through amplifiers 79a and 79b, to change the signal path according to the mode control signal supplied to the matrix circuit 78. The above matrix circuit 78 performs a changeover operation to change over the signal path, so that the output signal of the audio signal detector 77a is supplied to the amplifiers 79a and 79b when the mode of the audio signal is bilingual A. The output signal of the audio signal detector 77b is supplied to the amplifiers 79a and 79b when the mode of the audio signal is bilingual B.

Next, if the audio disc 15b is to be loaded into the reproducing apparatus 30 as the disc 15, the disc case 10 accommodating the audio disc 15b is inserted into the reproducing apparatus 30. The lid plate 12 makes contact with the detection switch group 68 due to the insertion of the disc case 10. A result is obtained which indicates the open or closed states of each of the detection switches and is supplied to the micro-computer 76. Accordingly, a detection is performed to detect that the disc 15b is an audio disc, whether the surface of the disc facing up (reproducing surface) is the first or the second side, and the mode of the audio signal. According to the detected result if the audio signal is a three-channel or a four-channel signal, the lamp 86a or the lamp 86b of the indicator 86 is turned ON. On the other hand, when the audio signal is a two-channel signal, the lamp 86c is turned ON.

In the case where the lamp 86c is turned ON, either one of the switches 85a and 85b is pushed according to the program system to be reproduced, since there are two program systems A and B in the two-channel signal. Hence, a signal selected at the selection switch 85 in FIG. 4 is supplied to the micro-computer 76.

When reproduction of the loaded audio disc 15b begins, the address signal detected at the address signal detection circuit 75 is supplied to the micro-computer 76 wherein detection is performed to detect the mode discriminating signal included together with the address signal. The microcomputer 76 produces and supplies the mode control signal to the decoder 83 through the terminals 76a and 76b, by use of the detected mode bits and the selection signal from the selection switch 85. The above mode control signal produced by the microcomputer 76 is "0, 0" when the mode of the audio signal is three-channel, "1, 0" when the mode of the audio signal is four-channel, "0, 1" when the mode of the audio signal is two-channel of the first program system A, that is, when the mode of the audio signal is two-channel A, and "1, 1" when the mode of the audio signal is two-channel of the second program system B, that is, when the mode of the audio signal is two-channel B.

The above mode control signal is also supplied to the matrix circuit 78. However, the muting signal is supplied to the matrix circuit 78 through the output terminal 76c of the micro-computer 76, since the detection switch 68 detects that the loaded disc is an audio disc. Accordingly, a circuit of a video disc reproducing system is put into a non-operational state. Moreover, when the mode of the audio signal is three-channel as indicated by the mode discriminating signal, the lamp 86b is turned OFF. On the other hand, when the mode of the audio signal is four-channel, the lamp 86a is turned OFF.

When the mode of the audio signal is three-channel, that is, when a three-channel audio signal and a still picture video signal are recorded in the audio disc, the decoder 83 produces audio signals of first, second, and third channels through output terminals 84a, 84b, and 84c, respectively, and a still picture video signal through an output terminal 84e, according to the mode control signal supplied to the decoder 83. On the other hand, in a case where the mode of the audio signal is four-channel, the decoder 83 produces audio signals of first, second, third, and fourth channels through output terminals 84a through 84d, respectively. When the mode of the audio signal is two-channel A or two-channel B, the decoder 83 produces a two-channel stereo signal of the first program system A through the output terminals 84a and 84b, or a two-channel stereo signal of the second program system B through the output terminals 84c and 84d.

Therefore, when the mode control signal obtained through the output terminals 76a and 76b of the micro-computer 76 is "0, 0", this indicates a monaural mode of a video disc or a three-channel (plus still picture) mode of an audio disc. Similarly, when the mode control signal obtained through the output terminals 76a and 76b of the micro-computer 76 is "1, 0", "0, 1", and "1, 1", these cases respectively indicate a stereo mode of a video disc or a four-channel mode of an audio disc, a bilingual A mode of a video disc or a two-channel A of an audio disc, and a bilingual B of a video disc or a two-channel B of an audio disc. Accordingly, one mode control signal can either indicate an audio signal mode of a video disc or an audio signal mode of an audio disc. Hence, the number of output ports in the micro-computer 76 which are required can be reduced, since the number of bits required to describe the mode control signal can be reduced. The construction of the apparatus can accordingly be simplified.

Figure 6:
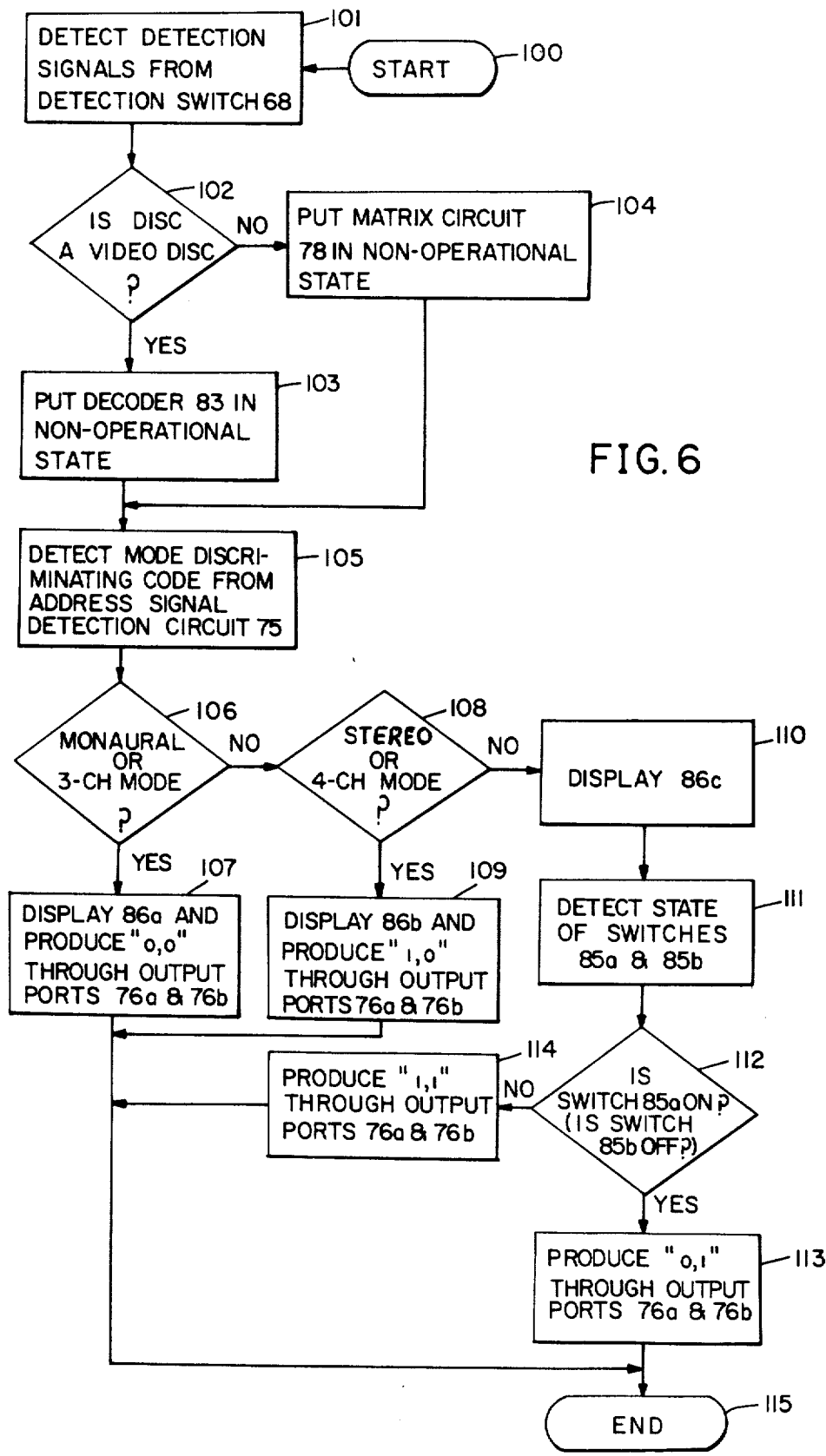
FIG. 6 is a flow chart showing the operation of a micro-computer in the system shown in FIG. 4.

The operation of the micro-computer 76 is indicated in a flow chart shown in FIG. 6, as being started from a step 100. At step 101 the detection signals from the detection switch 68 is detected, and at step 102 these detection signals indicate whether the disc 15 is a video disc. If the result of the discrimination at the step 102 is "YES", a step 103 puts the decoder 83 in a non-operational state by supplying thereto the muting signal through the output terminal 76c. On the other hand, if the result of the discrimination at the step 102 is "NO", that is, if the disc 15 is an audio disc, a step 104 puts the matrix circuit 78 in a non-operational state by supplying the muting signal through the output terminal 76c.

A subsequent step 105 detects the mode discriminating code which is included within the address signal from the address signal detection circuit 75. A step 106 discriminates whether the mode of the video or audio disc is a monaural or a three-channel mode. If the result of the discrimination at the step 106 is "YES", the lamp 86a is turned ON and outputs "0, 0" are produced through output terminals 76a and 76b. On the other hand, if the result of the discrimination at the step 106 is "NO", a step 108 discriminates whether the mode of the video or audio disc is a stereo or a four-channel mode. If the result of the discrimination at the step 108 is "YES", the lamp 86b is turned ON and outputs "1, 0" are produced through output terminals 76a and 76b. On the other hand, if the result of the discrimination at the step 108 is "NO", the lamp 86c is turned ON at a step 110.

After step 110, a step 111 detects the states of the switches 85a and 85b. A step 112 discriminates whether the switch 85a is ON, that is, whether the switch 85b is OFF. If the result of the discrimination at the step 112 is "YES", it is an indication that the bilingual A or first program system A is to be reproduced, and outputs "0, 1" are produced through output terminals 76a and 76b. On the other hand, if the result of the discrimination at the step 112 is "NO", it is an indication that the bilingual B or the second program system B is to be reproduced, and outputs "1, 1" are produced through the output terminals 76a and 76b.

The operation of the micro-computer 76 advances to a step 115 subsequently to the steps 107, 109, 113, and 114.

In the above embodiment of the invention, the three-channel audio signal plus still picture video signal mode is given as a mode of the audio signal of the audio disc 15b. However, the above mode can be a two-channel audio signal plus still picture video signal mode.

Further this invention is not limited to these embodiments, but various variations and modifications may be made without departing from the scope of the invention.

What is claimed is:

1. An apparatus for reproducing signals from a rotary recording medium which may be either a first type or a second type rotary recording medium, said first type rotary recording medium being prerecorded with a video signal as a main information signal, audio signals accompanying the video signal, and an address signal including a mode discriminating code which indicates which one of four anticipated modes of audio signals are recorded thereon, said second type rotary recording medium being prerecorded with audio signals as main information signals and an address signal including a mode discriminating code which indicates which one of four anticipated modes of signals are recorded thereon, detecting means for detecting at least the type of rotary recording medium which is to be reproduced, and for producing a detection signal which at least includes a code indicating the detected type of rotary recording medium;

reproducing means for reproducing the recorded signals from said rotary recording medium;

address signal detecting means for detecting the address signal from among the signals reproduced by said reproducing means;

a micro-computer means responsive to the detection signal from said detecting means and the detected address signal from said address signal detecting means, for detecting the mode discriminating code included within the address signal, and for producing a two-bit mode control signal and a one-bit muting signal through three output ports thereof, said two-bit mode control signal specifying one of four reproducing modes by which the reproduced signals from said reproducing means are to be processed, said one-bit muting signal indicating the type of rotary recording medium which is being reproduced;

a first signal processing circuit means responsive to said two-bit mode control signal and to said one-bit muting signal and to the reproduced signals from said reproducing means, for processing the signals reproduced by said reproducing means according to the reproducing mode specified by said two-bit mode control signal when said one-bit muting signal indicates that said first type rotary recording medium is being reproduced; and a second signal processing circuit means responsive to said two-bit mode control signal and to said one-bit muting signal from said micro-computer and to the reproduced signals from said reproducing means, for processing the signals reproduced by said reproducing means according to said two-bit mode control signal when said muting signal indicates that said second type rotary recording medium is being reproduced, four codes comprising said two-bit mode control signal being commonly used to specify four reproducing modes by which signals reproduced from said first type rotary recording medium are to be processed and four reproducing modes by which signals reproduced from said second type rotary recording medium are to be processed.

2. The apparatus as claimed in claim 1 in which said first and second types of rotary recording mediums are independently accommodated within a case having a jacket for accommodating said first type or second type rotary recording medium and a lid plate for closing an opening of said jacket, said lid plate has a different configuration according to the type of rotary recording medium accommodated within said jacket, and said detecting means detects the type of rotary recording medium responsive to said configuration of said lid plate when said case is inserted into said reproducing apparatus.

3. The apparatus as claimed in claim 1 which further comprises at least three display elements provided in common with respect to said first and second types of rotary recording mediums, which respectively correspond to the anticipated modes by which the signals are recorded on said first and second types of rotary recording mediums.

4. An apparatus as claimed in claim 1 in which signals recorded on said first and second types of rotary recording mediums with one of said anticipated modes are reproduced and processed with either one of two reproducing modes among the four reproducing modes, and said reproducing apparatus further comprises selection switch means coupled to said micro-computer for further selecting said one of two reproducing modes.

5. The apparatus as claimed in claim 1 in which a first code constituted by said two-bit mode control signal commonly specifies a monaural mode by which the audio signal reproduced from said first type of rotary recording medium is to be processed and a three-channel mode by which the signals reproduced from said second type of rotary recording medium are to be processed, a second code constituted by said two-bit mode control signal commonly specifies a stereo mode by which the audio signals reproduced from said first type of rotary recording medium are to be processed and a four-channel mode by which the audio signals reproduced from said second type of rotary recording medium are to be processed, a third code comprising said two-bit mode control signal commonly specifies one of two program modes in a bilingual mode by which the audio signals reproduced from said first type of rotary recording medium are to be processed and one of two program modes in a two two-channel mode by which the audio signals reproduced from said second type of rotary recording medium are to be processed, and a fourth code constituted by said two-bit mode control signal commonly specifies the other one of the two program modes in the bilingual mode and the other one of the two program modes in the two two-channel mode.

6. The apparatus as claimed in claim 5 which further comprises selection switch means coupled to said micro-computer for further selecting one of the two program modes in the bilingual mode with respect to said first type of rotary recording medium and one of the two program modes in the two two-channel mode with respect to said second type of rotary recording medium.

* * * * *